United States Patent
Chang et al.

(10) Patent No.: US 8,214,500 B2
(45) Date of Patent: Jul. 3, 2012

(54) METHOD FOR ALLOCATING RESOURCE AND RECEIVING DATA TO CONTROL A TRANSMISSION ERROR

(75) Inventors: Sung Cheol Chang, Daejeon (KR); Sung-Geun Jin, Daejeon (KR); Kwang-Jae Lim, Daejeon (KR); Chul Sik Yoon, Seoul (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/676,996

(22) PCT Filed: Sep. 10, 2008

(86) PCT No.: PCT/KR2008/005349
§ 371 (c)(1),
(2), (4) Date: Mar. 8, 2010

(87) PCT Pub. No.: WO2009/035263
PCT Pub. Date: Mar. 19, 2009

(65) Prior Publication Data
US 2010/0318659 A1    Dec. 16, 2010

(30) Foreign Application Priority Data
Sep. 10, 2007    (KR) .......... 10-2007-0091385

(51) Int. Cl.
*G06F 15/173* (2006.01)
*H04B 7/14* (2006.01)
*H04W 72/00* (2009.01)
*H04L 1/18* (2006.01)

(52) U.S. Cl. ........ 709/226; 709/224; 709/236; 370/315; 370/329; 370/389; 370/395.41; 455/450; 714/748; 714/750

(58) Field of Classification Search ........... 709/224, 709/226, 236, 242; 370/315, 329, 389, 395.41; 455/450; 714/748, 750
See application file for complete search history.

(56) References Cited

U.S. PATENT DOCUMENTS

| | | | |
|---|---|---|---|
| 6,697,855 B1 * | 2/2004 | Le Dantec et al. | 709/223 |
| 6,766,348 B1 * | 7/2004 | Combs et al. | 718/104 |
| 7,174,379 B2 * | 2/2007 | Agarwal et al. | 709/226 |
| 7,227,868 B2 * | 6/2007 | Inden | 370/395.52 |
| 7,464,166 B2 | 12/2008 | Larsson et al. | |
| 7,664,507 B2 * | 2/2010 | Tamura et al. | 455/450 |
| 7,872,992 B2 * | 1/2011 | Ukita et al. | 370/256 |
| 7,987,409 B2 * | 7/2011 | Suh et al. | 714/774 |
| 8,072,911 B2 * | 12/2011 | Astely et al. | 370/280 |
| 2005/0060409 A1 * | 3/2005 | Dube et al. | 709/226 |
| 2006/0233200 A1 * | 10/2006 | Fifield et al. | 370/473 |
| 2007/0076684 A1 * | 4/2007 | Lee et al. | 370/350 |
| 2007/0124640 A1 * | 5/2007 | Suh et al. | 714/748 |

(Continued)

FOREIGN PATENT DOCUMENTS

KR    10-2006-0004935 A    1/2006

(Continued)

*Primary Examiner* — Alina N. Boutah
(74) *Attorney, Agent, or Firm* — Jefferson IP Law, LLP

(57) ABSTRACT

The present invention relates to a resource allocation and data receiving method. A resource allocation message for allocating a resource for an uplink dedicated channel is transmitted to a relay station, a receipt check message on the resource allocation message is received from the relay station, and successful resource allocation is checked.

4 Claims, 10 Drawing Sheets

U.S. PATENT DOCUMENTS

| | | | |
|---|---|---|---|
| 2007/0124642 A1* | 5/2007 | Suh et al. | 714/749 |
| 2007/0155315 A1* | 7/2007 | Lee et al. | 455/11.1 |
| 2008/0031181 A1* | 2/2008 | Tsai et al. | 370/315 |
| 2008/0031182 A1* | 2/2008 | Maheshwari et al. | 370/320 |
| 2008/0052397 A1* | 2/2008 | Venkataraman et al. | 709/226 |
| 2008/0070582 A1* | 3/2008 | Cai | 455/450 |
| 2008/0130550 A1* | 6/2008 | Kim et al. | 370/315 |
| 2008/0285499 A1* | 11/2008 | Zhang et al. | 370/315 |
| 2008/0285500 A1* | 11/2008 | Zhang et al. | 370/315 |
| 2009/0010198 A1* | 1/2009 | Boariu et al. | 370/315 |
| 2009/0088164 A1* | 4/2009 | Shen et al. | 455/436 |
| 2009/0221288 A1* | 9/2009 | Zhang et al. | 455/434 |
| 2009/0238196 A1* | 9/2009 | Ukita et al. | 370/408 |
| 2009/0287976 A1* | 11/2009 | Wang et al. | 714/748 |
| 2010/0017672 A1* | 1/2010 | Suga | 714/748 |
| 2010/0046413 A1* | 2/2010 | Jin et al. | 370/315 |
| 2010/0182946 A1* | 7/2010 | Ni et al. | 370/315 |
| 2010/0246478 A1* | 9/2010 | Liu et al. | 370/315 |
| 2010/0304667 A1* | 12/2010 | Chen et al. | 455/9 |

FOREIGN PATENT DOCUMENTS

| | | | |
|---|---|---|---|
| KR | 10-2007-0048438 A | 5/2007 | |

* cited by examiner

FIG. 8

| Syntax | Size | Notes |
| --- | --- | --- |
| MAC Header() { | | |
| HT | 1 bit | Shall be set to 1 |
| EC | 1 bit | Shall be set to 1 |
| Type | 1 bit | Shall be set to 1 |
| Extended TYPE | 3 bits | Shall be set to 001 for RS_UL_DCH request header |
| Type | 4 bits | 0000 = DCH Request<br>0001 = DCH Assignment Acknowledgement (ACK)<br>00042 - 1111 = Reserved |
| if (TYPE==0000) { | | DCH Request |
|   DCHTYPE | 2 bit | 00 = DCH Request Incremental<br>01 = DCH Request Aggregate<br>10 = DCH Request Rate Based<br>11 = Reserved |
|   If (DCHTYPE == 00) { | 1 bit | DCH Request Incremental |
|     Bandwidth request | 16 bits | Number of bytes requested by the RS. Zero in this field indicated DCH release request. |
|     N | 4 bits | Allocation repeats once every N frames. |
|   } else if (DCHTYPE == 01) { | | DCH Request Aggregate |
|     Average rate | 20 bits | Average data rate in units of bytes per second<br>18 MSB bits: magnitude<br>2 LSB bits: base-10 exponent |
|   } | | |
|   RS CID | 8 bits | Reduced Basic CID of RS |
| } else if (TYPE == 0001) { | | DCH Assignment Acknowledgement (ACK) |
|   Frame Number | 8 bits | 8-bit LSBs of the frame in which the RS_UL_DCH assignment IE is received |
|   Update type | 2 bit | This field shall be the same value in the corresponding RS_UL_DCH assignment IE<br>00 = Normal<br>01 = Service flow based<br>10-11 = Reserved |
|   if (Update type == 01) { | | Service flow based |
|     Access RSCID | 8 bits | Reduced basic CID of the access RS of the MS that completed the service flow event. This field shall be the same value in the corresponding RS_UL_DCH assignment IE. |
|   } else { | | |
|     Reserved | 8 bits | Shall be set to 0. |
|   } | | |
|   RS CID | 8 bits | Reduced Basic CID of RS |
|   Reserved | 2 bits | Shall be set to 0. |
| } | | |
| HCS | 8 bit | Header check squence |
| } | | |

FIG. 10

| Syntax | Size | Notes |
|---|---|---|
| RU_UL_DCH HARQ Retx IE0 { | | |
| Type | 5 bit | RU_UL_DCH HARQ Retx IE = 0x02 |
| Length | 4 bit | Variable |
| Number of HARQ Retx sub-bursts | 3 or 4 bits | 3 bits in UL-MAP of access region. 4 bits in relay region |
| for(i=0;i<Number of HARQ Retx sub-burstsl; i++){ | | |
| RU_UL_DCH Identifier for HARQ | 6 bit | |
| in-band or out-band Retx | 1 bit | 0:in-bnad HARQ retransmission<br>1 : out-bnad HARQ retransmission |
| Frame Number | 5 bit | |
| if(in-band or out-band Retx==1) { | | out-bnad HARQ retransmission |
| | | |
| Subchannel offset | 8 bits | |
| Duration | 10 bits | Resources allocated to DCH (in DFDMA slots) |
| if(HARQ IR) { | | |
| UIUC | 4 bits | |
| Repetition coding indication | 2 bits | 0b00 - no repetition coding<br>0b01 - repetition coding of 2<br>0b10 - repetition coding of 4<br>0b11 - repetition coding of 6 |
| SP_ID | 2 bits | |
| } | | |
| Reserved | 2 bits | Shall be set to 0. |
| } | | |
| } | | |
| } | | |

# METHOD FOR ALLOCATING RESOURCE AND RECEIVING DATA TO CONTROL A TRANSMISSION ERROR

BACKGROUND OF THE INVENTION (a) Field of the Invention

The present invention relates to a resource allocation and data receiving method, and particularly, it relates to a data receiving method applying a reliable resource allocation method and a HARQ in a relay system.

(b) Description of the Related Art

The IEEE 802.16j task group (TG) has standardized the mobile multi-hop relay system. FIG. 1 shows a schematic diagram of a mobile multi-hop relay system according to the related art. As shown in FIG. 1, the mobile multi-hop relay system includes a relay station (RS), a multi-hop relay base station (MR-BS), and a mobile station (MS). The RS relays data between the MR-BS and the MS, and the MS can directly communicate with the MR-BS, and can communicate with at least one RS.

In the mobile multi-hop relay system, the RS receives a relay station uplink dedicated channel (RS_UL_DCH) from the MR-BS so as to transmit data to the MR-BS, and the RS_UL_DCH represents a channel that is allocated by fixing a resource in the uplink.

The RS_UL_DCH is managed by an RS_UL_DCH assignment information element (RS_UL_DCH assignment IE). FIG. 2 shows a resource allocation method according to the related art. As shown in FIG. 2, the RS_UL_DCH assignment IE is unidirectionally transmitted from the base station to the RS, and the resources used by the BS and the RS when the RS_UL_DCH assignment IE generates a loss because of a change of the radio channel are mismatched. That is, after transmitting the RS_UL_DCH assignment IE, the MR-BS considers that the RS will transmit data through a dedicated resources B that is allocated through the RS_UL_DCH assignment IE, but the RS transmits the data through a previously allocated dedicated resource A. Therefore, when the RS_UL_DCH assignment IE is lost, the data that are transmitted through the RS_UL_DCH are lost.

According to the related art, when the MR-BS transmits data through the RS_UL_DCH, it has no skill of controlling transmission errors.

SUMMARY OF THE INVENTION

The present invention has been made in an effort to provide a reliable resource allocation method and data receiving method for controlling a transmission error.

An exemplary embodiment of the present invention provides a method for a base station to allocate a resource, including: transmitting a resource allocation message for allocating a resource for an uplink dedicated channel to a relay station; and checking that the resource is successfully allocated by receiving a receipt check message on the resource allocation message from the relay station.

Another embodiment of the present invention provides a method for a base station to receive data, including: checking whether data that are received from a relay station through an uplink dedicated channel have an error; and transmitting a data retransmission request message to the relay station when the received data are found to have an error.

Yet another embodiment of the present invention provides a method for a relay station to transmit data, including: receiving a retransmission request message on the data that are transmitted through an uplink dedicated channel from a base station; and retransmitting the data that are requested to be retransmitted by the retransmission request message.

According to the present invention, a resource of the RS_UL_DCH can be allocated with reliability, and a transmission error of the data that are received through the RS_UL_DCH can be controlled.

BRIEF DESCRIPTION OF THE DRAWINGS

FIG. 8 shows a message format of an RS UL_DCH header with DCH assignment acknowledgement.

FIG. 10 shows a field of an RS_UL_DCH HARQ Retx IE according to an exemplary embodiment of the present invention.

DETAILED DESCRIPTION OF THE EMBODIMENTS

Figure 1:
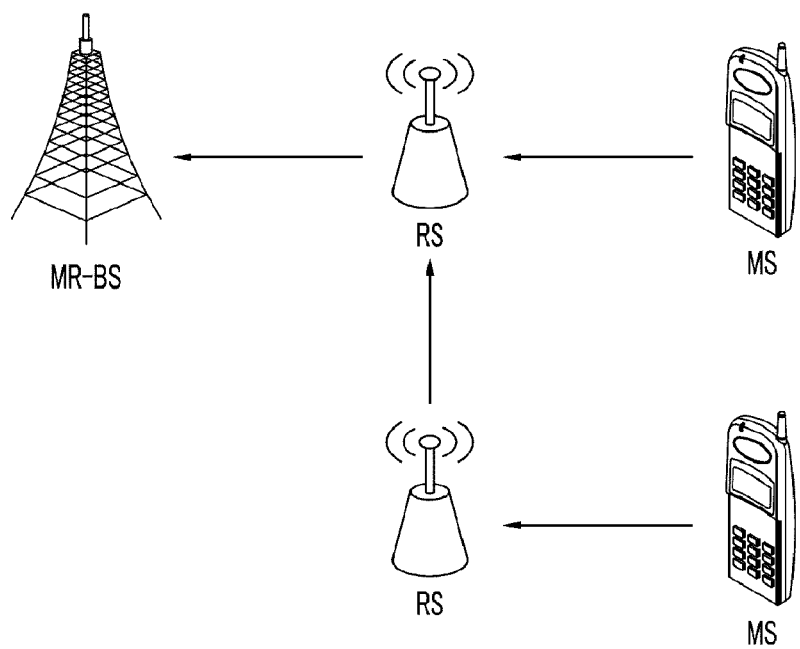
FIG. 1 shows a schematic diagram of a mobile multi-hop relay system according to the related art.
Figure 2:
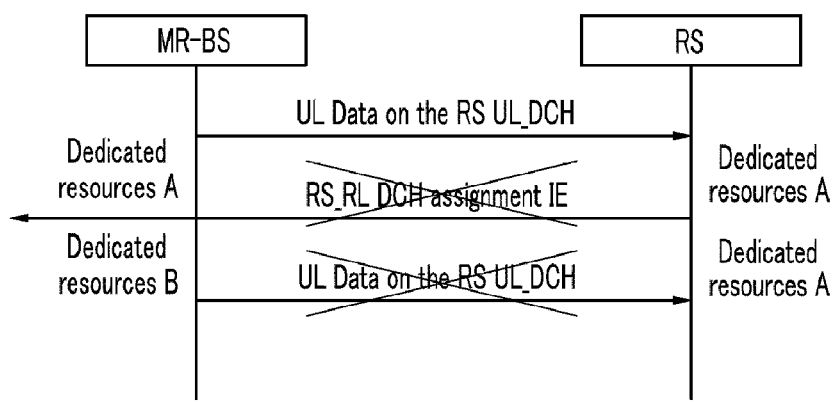
FIG. 2 shows a conventional resource allocation method according to the related art.

In the following detailed description, only certain exemplary embodiments of the present invention have been shown and described, simply by way of illustration. As those skilled in the art would realize, the described embodiments may be modified in various different ways, all without departing from the spirit or scope of the present invention. For clarification of drawings in the present invention, parts that are not related to the description will be omitted, and the same parts will have the same reference numerals throughout the specification.

Throughout the specification, unless explicitly described to the contrary, the word "comprise" and variations such as "comprises" or "comprising", will be understood to imply the inclusion of stated elements but not the exclusion of any other elements. Also, the terms of a unit, a device, and a module in the present specification represent a unit for processing a predetermined function or operation, which can be realized by hardware, software, or combination of hardware and software.

Figure 3:
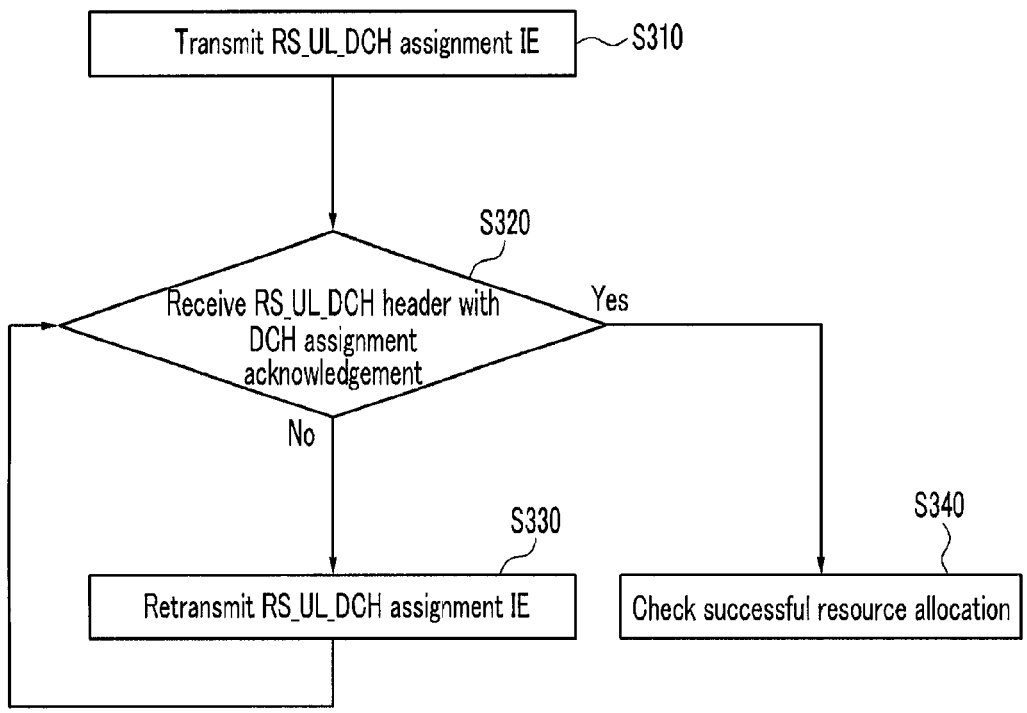
FIG. 3 shows a flowchart of a resource allocation method according to an exemplary embodiment of the present invention.
Figure 5:
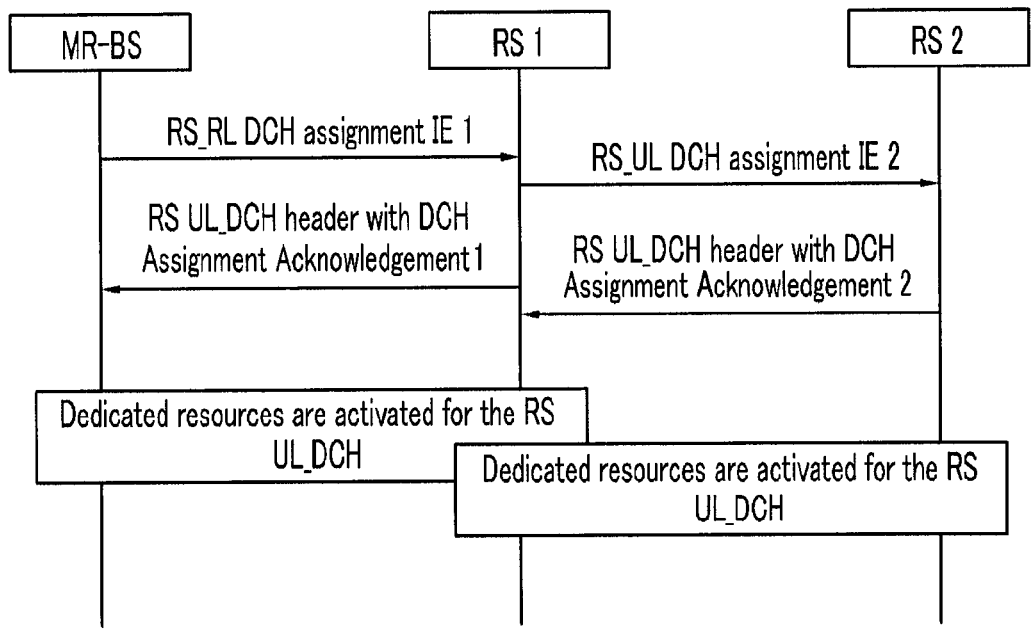
FIG. 5 shows a message flow in the case of a multi-hop in a resource allocation method according to an exemplary embodiment of the present invention.
Figure 6:
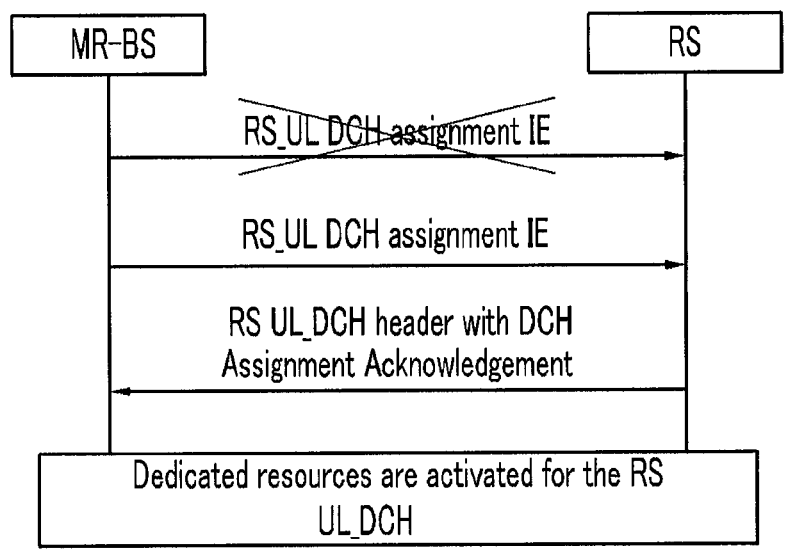
FIG. 6 shows a message flow when an RS_UL_DCH assignment IE is lost in a resource allocation method according to an exemplary embodiment of the present invention.
Figure 7:
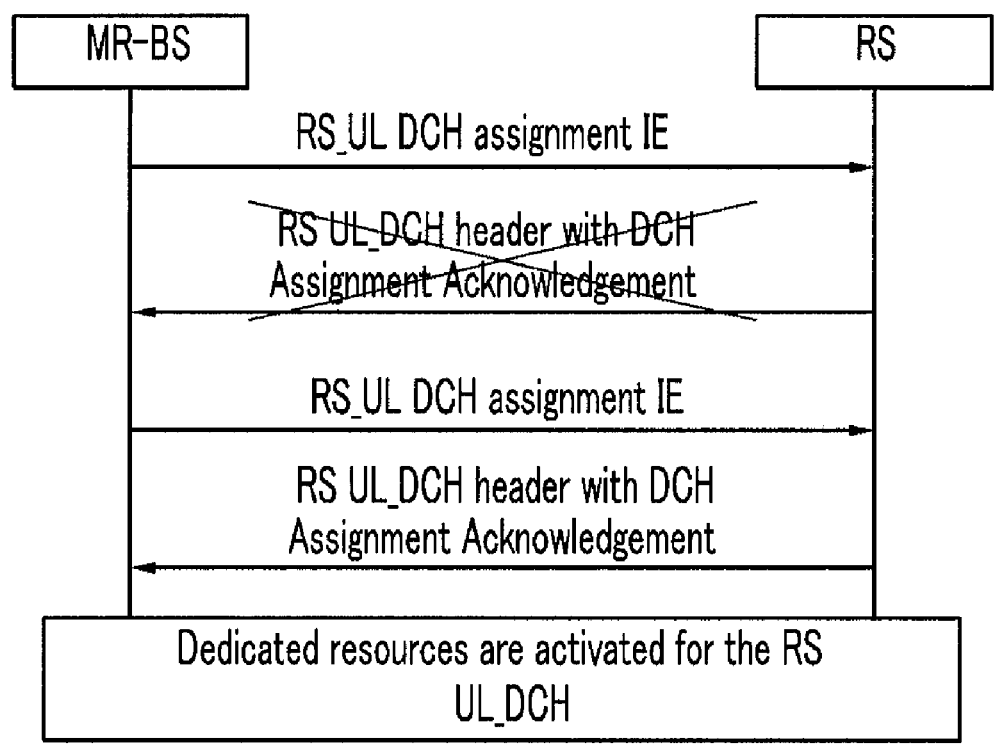
FIG. 7 shows a message flow when an RS UL_DCH header with DCH assignment acknowledgement is lost in a resource allocation method according to an exemplary embodiment of the present invention.

A resource allocation method according to an exemplary embodiment of the present invention will now be described with reference to FIGS. 3 to 8. FIG. 3 shows a flowchart of a resource allocation method according to an exemplary embodiment of the present invention, FIG. 4 shows a message flow in the case of a single hop in a resource allocation method according to an exemplary embodiment of the present invention, FIG. 5 shows a message flow in the case of a multi-hop in a resource allocation method according to an exemplary embodiment of the present invention, FIG. 6 shows a message flow when an RS_UL_DCH assignment IE is lost in a resource allocation method according to an exemplary embodiment of the present invention, and FIG. 7 shows a message flow when an RS UL_DCH header with DCH assignment acknowledgement having a dedicated channel allocation receipt report is lost in a resource allocation method according to an exemplary embodiment of the present invention.

As shown in FIG. 3, the MR-BS transmits an RS_UL_DCH assignment IE that is a fixed resource allocation message to the RS (S310). The RS_UL_DCH assignment IE represents a message for allocating a resource for the RS_UL_DCH. When normally receiving the RS_UL_DCH assignment IE from the MR-BS, the RS includes a DCH assignment acknowledgement message for indicating a normal receipt of the RS_UL_DCH assignment IE into a header of the RS UL_DCH, and transmits the same to the MR-BS. That is, the RS transmits an RS UL_DCH header with DCH assignment acknowledgement to the MR-BS. When receiving the RS UL_DCH header with DCH assignment acknowledgement from the RS (S320), the MR-BS checks that a resource is successfully allocated to the RS_UL_DCH (S340).

Here, the RS UL_DCH header with DCH assignment acknowledgement is transmitted to the first position of the first frame at which the allocated resource is activated. FIG. 8 shows a message format of an RS UL_DCH header with DCH assignment acknowledgement. Referring to FIG. 8, when "TYPE" is given as "0001," it means that the message is a DCH assignment acknowledgement. In FIG. 8, the RS UL_DCH header with a DCH assignment acknowledgement message includes a frame number, and the frame number indicates a frame for receiving the RS_UL_DCH assignment IE.

Figure 4:
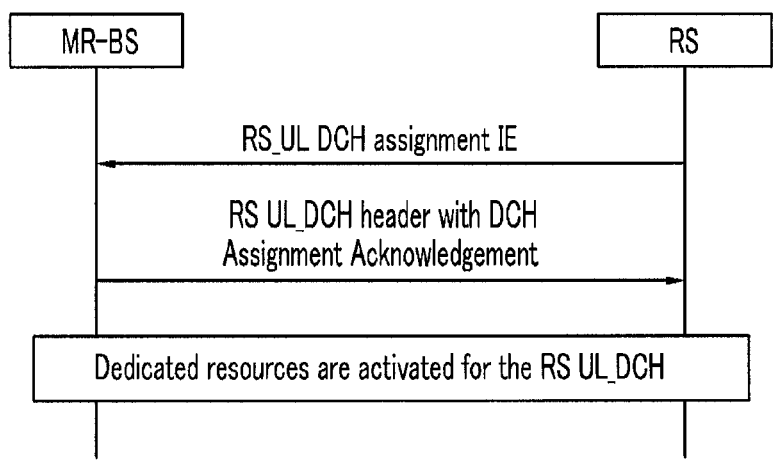
FIG. 4 shows a message flow in the case of a single hop in a resource allocation method according to an exemplary embodiment of the present invention.

Regarding the message flow in the case of a single hop with reference to FIG. 4, the RS_UL_DCH assignment IE is normally transmitted from the MR-BS to the RS, and the RS UL_DCH header with DCH assignment acknowledgement is normally transmitted from the RS to the MR-BS to know that the resource allocated for the RS_UL_DCH is activated between the MR-BS and the RS.

Regarding the message flow in the case of a multi-hop with reference to FIG. 5, when the MS-BS transmits an RS_UL_DCH assignment IE 1 to the RS 1, the RS 1 transmits an RS_UL_DCH assignment IE 2 to the RS 2. In this instance, the RS_UL_DCH assignment IE 2 may be generated by the MS-BS or the RS 1. The RS 1 transmits the RS UL_DCH header with DCH assignment acknowledgement 1 to the MR-BS, and the RS 2 transmits the RS UL_DCH header with DCH assignment acknowledgement 2 to the RS 1.

When the RS_UL_DCH assignment IE is lost as shown in FIG. 6 or the RS UL_DCH header with DCH assignment acknowledgement is lost as shown in FIG. 7, the MR-BS cannot receive the RS UL_DCH header with DCH assignment acknowledgement. The MR-BS then retransmits the RS_UL_DCH assignment IE (S330).

When the resource of the RS_UL_DCH is allocated by the resource allocation method according to the exemplary embodiment of the present invention, the MS-BS receives data from the RS through the allocated resource of the RS_UL_DCH.

A data receiving method according to an exemplary embodiment of the present invention will now be described with reference to FIG. 9 to FIG. 12.

Figure 9:
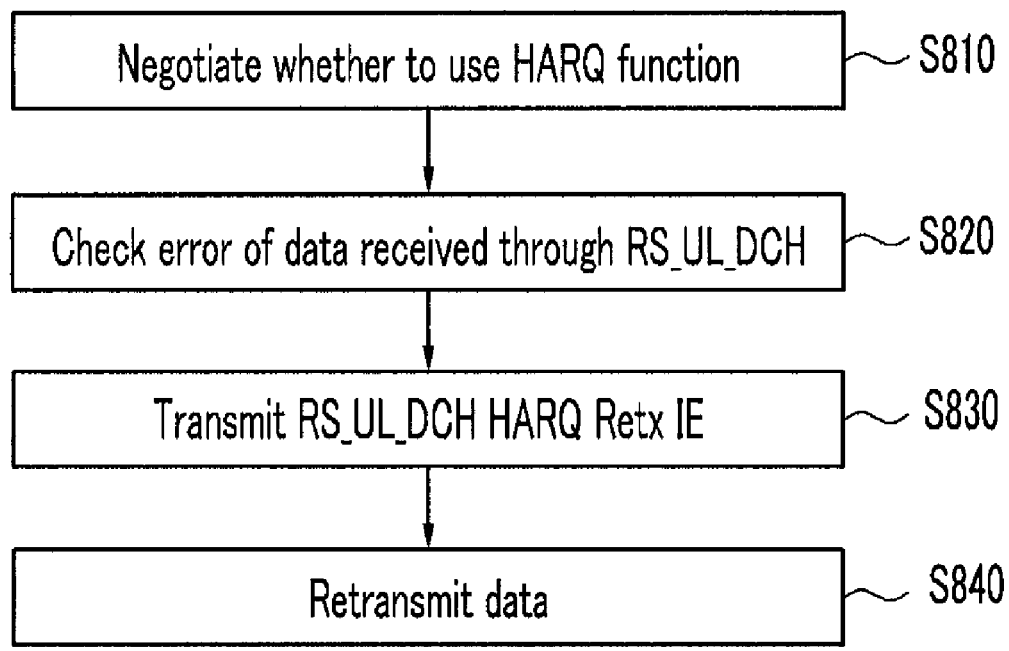
FIG. 9 shows a flowchart of a data receiving method according to an exemplary embodiment of the present invention.

FIG. 9 shows a flowchart of a data receiving method according to an exemplary embodiment of the present invention. As shown in FIG. 9, the MR-BS negotiates with the RS regarding whether to a hybrid automatic retransmit request (HARQ) function (S810). Table 1 shows a field format used for negotiation regarding the usage of the HARQ function. Referring to Table 1, when using the HARQ function, the MR-BS notifies the RS of the maximum number of frames that are stored so as to retransmit the data transmitted by the RS. The RS determines that the data that are transmitted after the maximum frame number are successfully transmitted.

TABLE 1

| Type | Length | Value | Scope |
|------|--------|-------|-------|
| TBA | 1 | Bit #0: HARQ support for the RS UL_DCH Bit #1-#2: Reserved Bit #3-#7: The maximum frame number of retransmission | SBC_REQSBC_RSP |

The MR-BS checks whether the data that are received from the RS through the RS_UL_DCH have an error (S820), and when an error is detected, the MR-BS transmits an RS_UL_DCH HARQ retransmit information element (RS_UL_DCH HARQ Retx IE) that is a data retransmission request message to the RS (S830). FIG. 10 shows a field of an RS_UL_DCH HARQ Retx IE according to an exemplary embodiment of the present invention.

In FIG. 10, the frame number represents a frame number of data to be retransmitted, and the RS UL_DCH Identifier for HARQ indicates an identifier of a DCH when there are a plurality of dedicated channels (DCH) between the MR-BS and the RS. Therefore, the data to be retransmitted by the frame number and the RS UL_DCH Identifier for HARQ are designated.

The in-band or out-band Retx represents a data retransmission method. The retransmission method includes an in-band method and an out-band method. When the in-band or out-band Retx is 0, it indicates the in-band method, and when the in-band or out-band Retx is 1, it indicates the out-band method.

Figure 11:
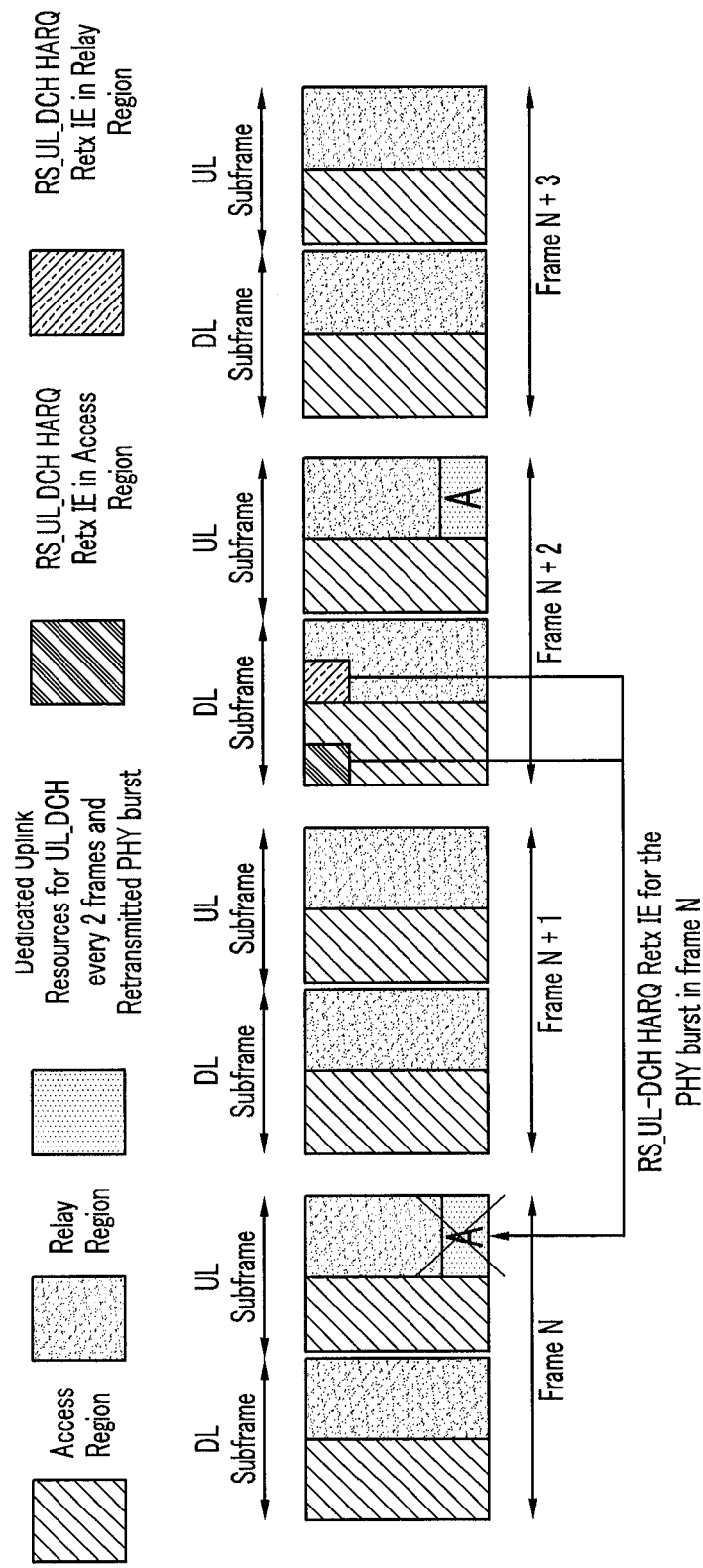
FIG. 11 shows a data receiving method in the case of using an in-band method according to an exemplary embodiment of the present invention.

The in-band method retransmits data through the allocated resource of the RS_UL_DCH. FIG. 11 shows a data receiving method in the case of using an in-band method according to an exemplary embodiment of the present invention. Referring to FIG. 11, a frame includes a downlink (DL) subframe and an uplink (UL) subframe, the downlink subframe and the uplink subframe respectively include an access region and a relay region, and a resource is allocated to the RS UL_DCH per 2 frames. The access region is a region in which the MR-BS communicates with the MS, and the relay region is a region in which the MR-BS communicates with the RS.

As shown in FIG. 11, when the resource of the RS_UL_DCH of the N-th frame generates a receiving error, the MR-BS transmits the RS_UL_DCH HARQ Retx IE to the RS to request data retransmission. In this instance, the RS_UL_DCH HARQ Retx IE can be transmitted in the access region and the relay region.

The out-band method additionally allocates a resource to retransmit data through the additionally allocated resource.

Figure 12:
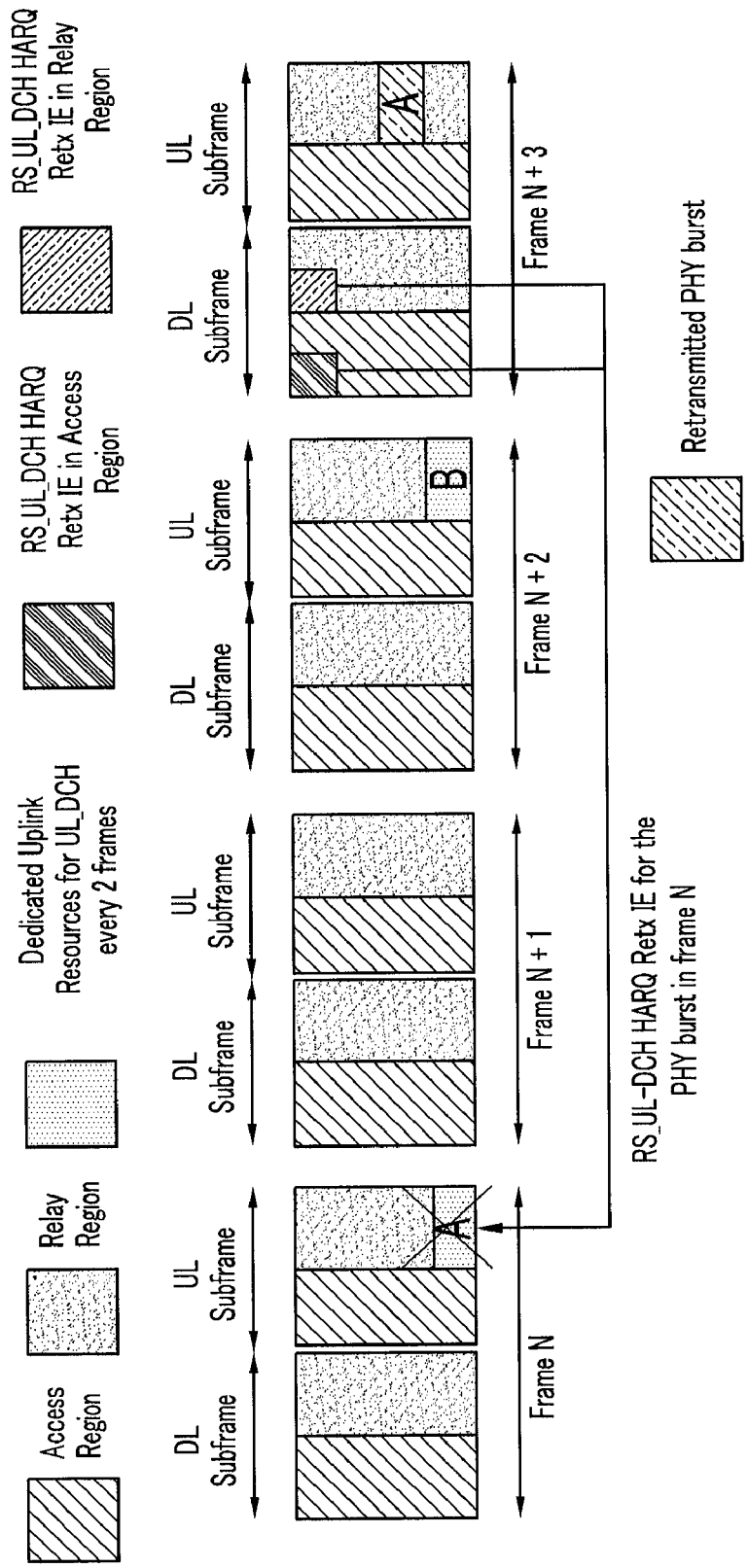
FIG. 12 shows a data receiving method in the case of using an out-band method according to an exemplary embodiment of the present invention.

FIG. 12 shows a data receiving method in the case of using an out-band method according to an exemplary embodiment of the present invention. As shown in FIG. 12, when the resource of the RS_UL_DCH of the N-th frame generates a receiving error, the RS_UL_DCH HARQ Retx IE is transmitted to the RS by including information on the additionally allocated resource in the RS_UL_DCH HARQ Retx IE to request data retransmission.

As shown in FIG. 10, in the case of using the out-band method, the RS_UL_DCH HARQ Retx IE includes a subchannel offset field and a duration field to designate an additionally allocated resource. Changed coding and modulation information is transmitted through a UIUC field and a repetition coding indication field.

When receiving the RS_UL_DCH HARQ Retx IE from the MR-BS, the RS retransmits data to the MR-BS, and the MR-BS receives the data again (S840). In this instance, in the case of using the in-band method, the RS retransmits the data through the fastest resource from among the allocated resources of the RS_UL_DCH channel, and in the case of using the out-band method, the RS retransmits the data through the additionally allocated resource.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a resource allocating station to allocate a resource, comprising:
   transmitting a resource allocation message for allocating a resource for an uplink dedicated channel to a relay station; and
   checking that the resource is successfully allocated by receiving a receipt check message on the resource allocation message from the relay station,
   wherein the receipt check message is included in a header of the relay station uplink dedicated channel, and
   wherein the header of the relay station uplink dedicated channel including the receipt check message includes a frame number that represents a frame for receiving a resource allocation message.

2. The method of claim 1, further comprising retransmitting the resource allocation message to the relay station when failing to receive the receipt check message on the resource allocation message from the relay station.

3. The method of claim 1, wherein the header of the relay station uplink dedicated channel including the receipt check message is transmitted at an initial position of an initial frame at which the allocated resource is activated.

4. The method of claim 1, wherein the resource allocating station corresponds to a base station or another relay station.

* * * * *